Oct. 27, 1959 J. D. RUSSELL 2,910,169
ARTICULATED CONVEYOR HAVING TENSION CONTROL MEANS
Original Filed Dec. 4, 1952 6 Sheets-Sheet 5

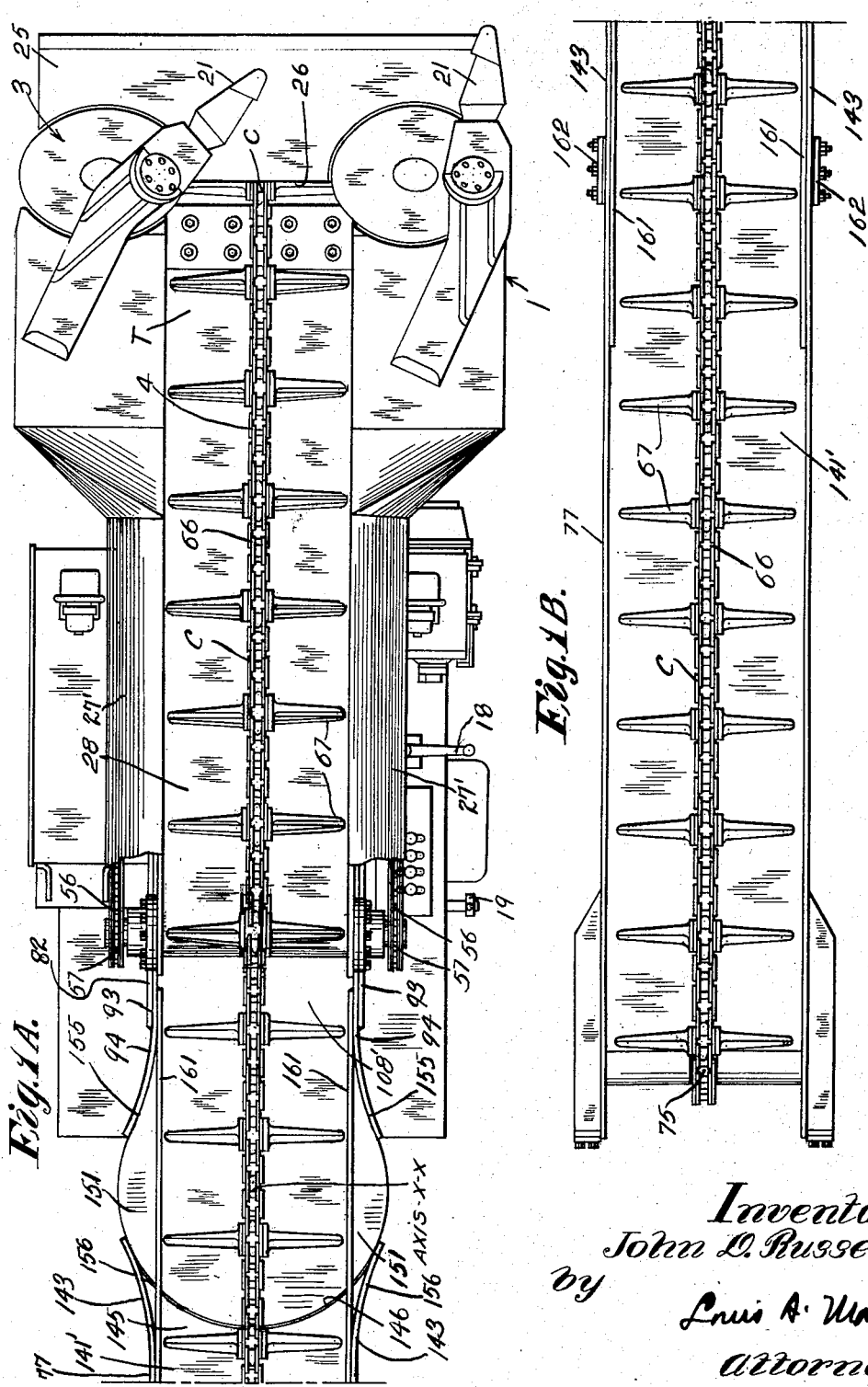

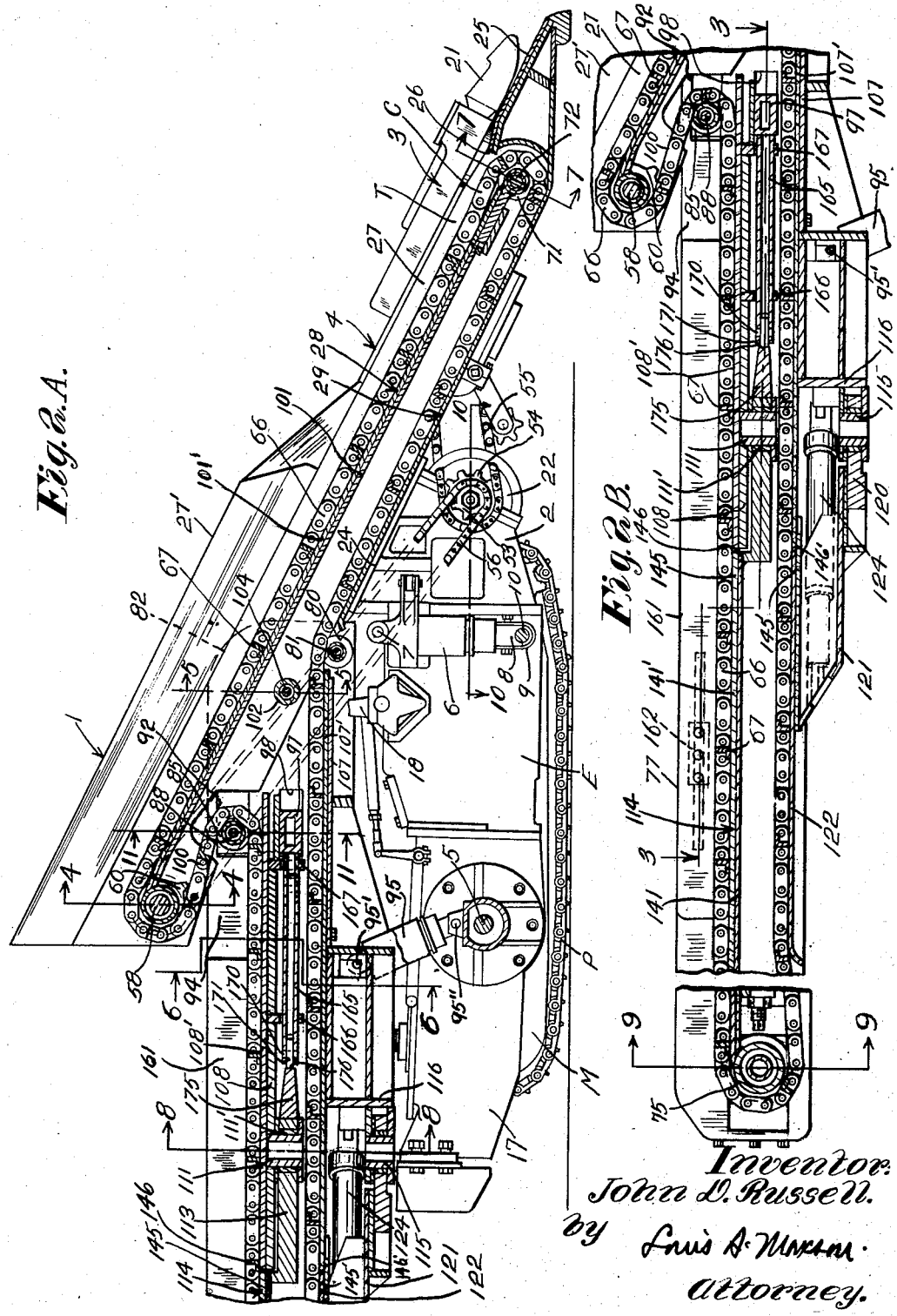

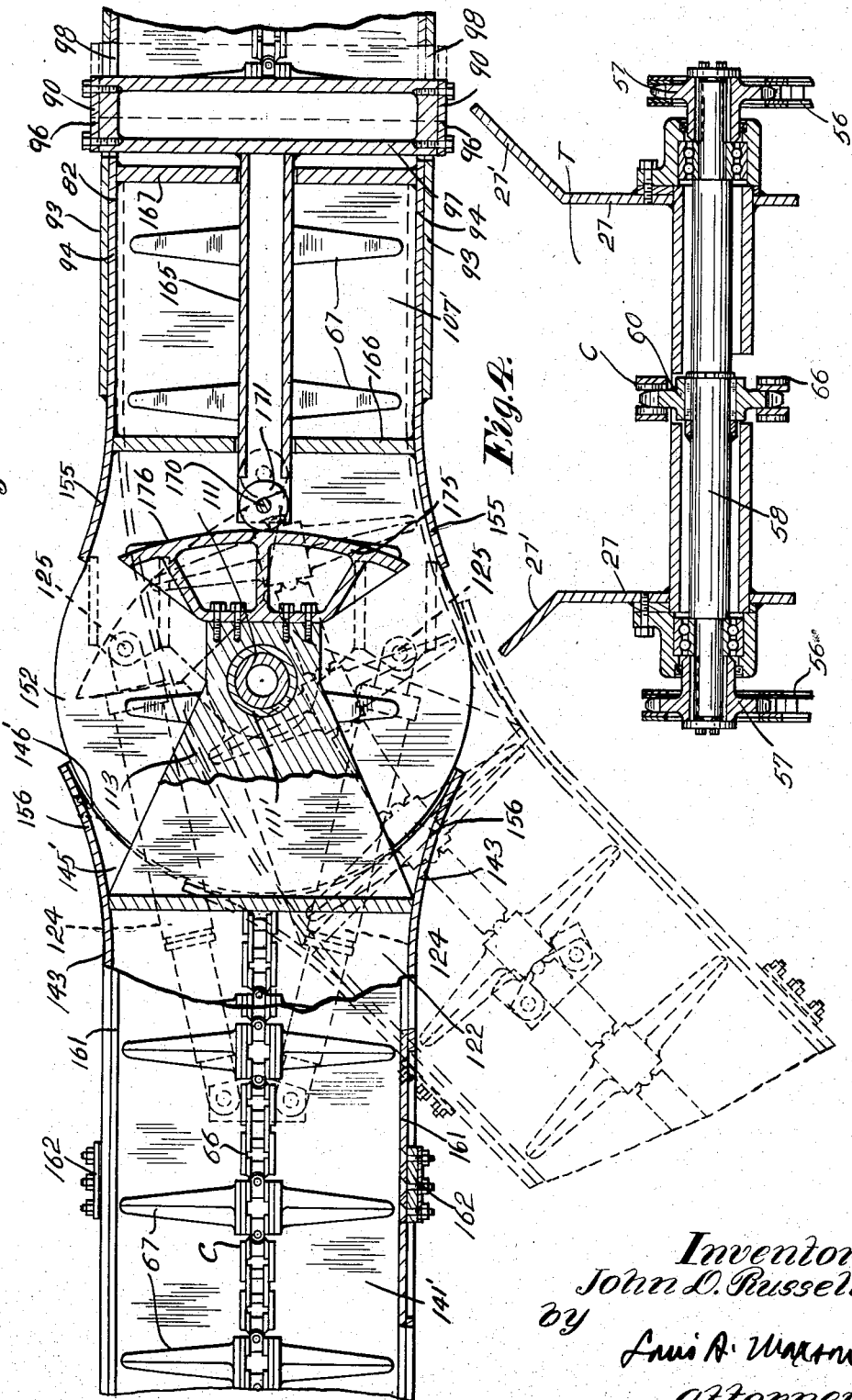

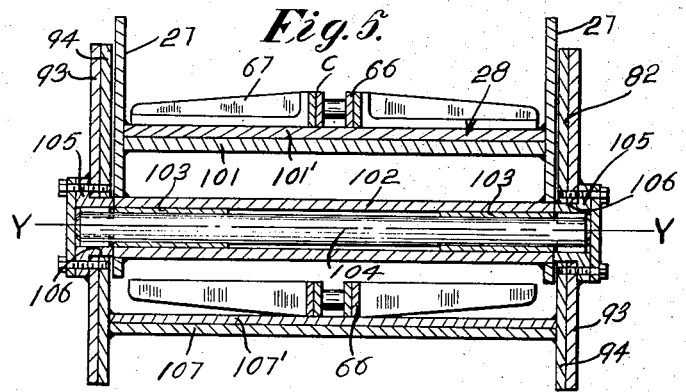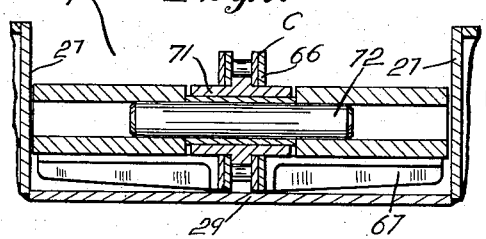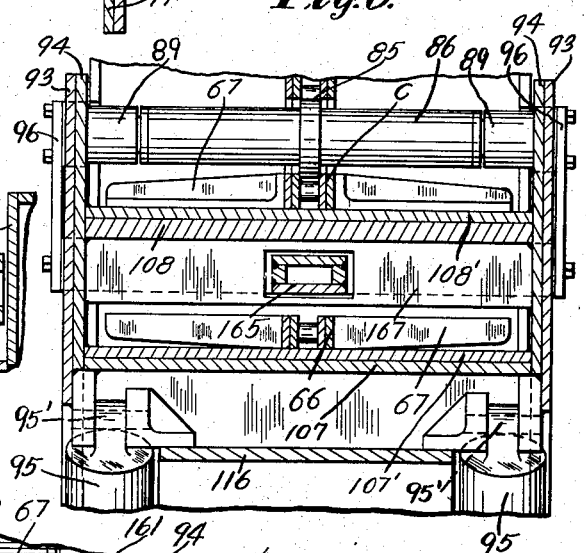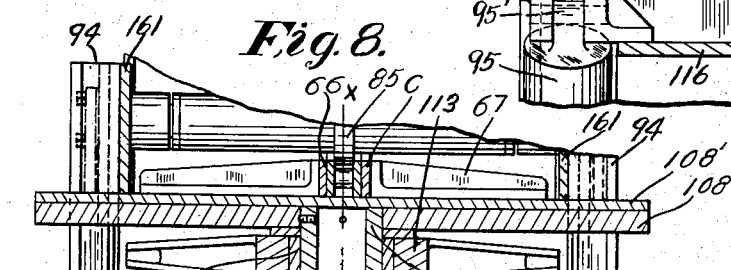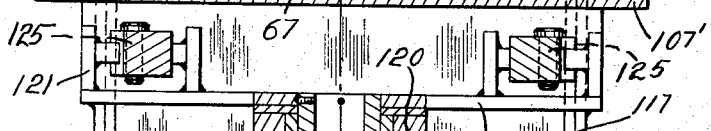

Inventor:
John D. Russell
by
Luis A. Maxam.
Attorney.

Oct. 27, 1959   J. D. RUSSELL   2,910,169
ARTICULATED CONVEYOR HAVING TENSION CONTROL MEANS
Original Filed Dec. 4, 1952   6 Sheets-Sheet 6
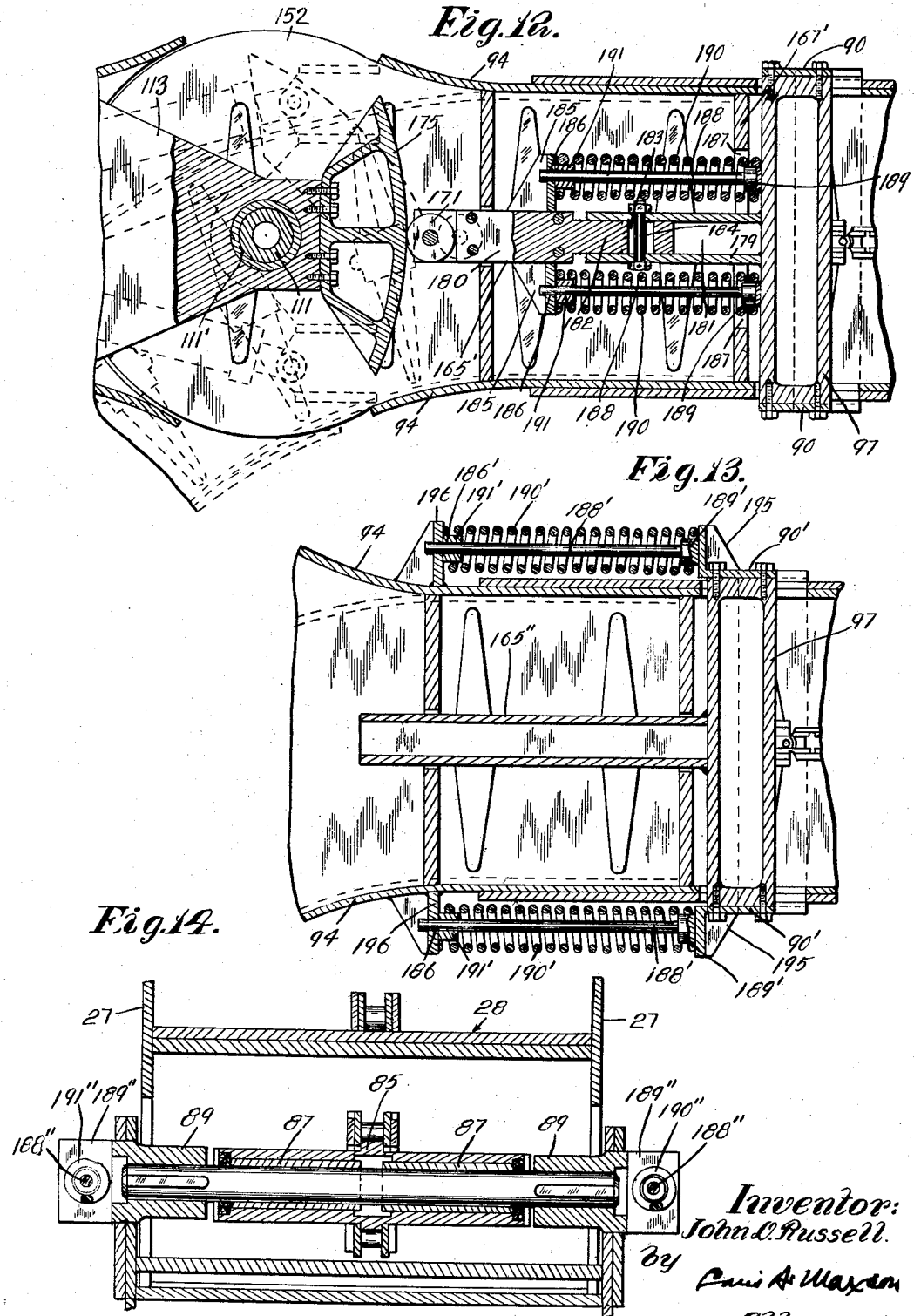
Inventor:
John D. Russell.
By
Attorney.

United States Patent Office 2,910,169
Patented Oct. 27, 1959

2,910,169

ARTICULATED CONVEYOR HAVING TENSION CONTROL MEANS

John D. Russell, Bradfordwoods, Pa., assignor to Joy Manufacturing Company, Pittsburgh, Pa., a corporation of Pennsylvania Continuation of application Serial No. 324,026, December 4, 1952. This application January 18, 1957, Serial No. 635,044

5 Claims. (Cl. 198—109)

This invention relates to material conveying apparatus, and more particularly to conveyors of the articulated type in which there are relatively laterally swingable portions and a center chain equipped with flights circulates in an orbit and is centered with respect to the conveyor at the forward and rearward ends of the latter by engagement with sprockets or idlers, and has its flights cooperate with the side walls of the conveyor trough as relative swinging between portions of the latter takes place, to guide the conveyor chain along the conveyor trough. With such conveyors, if the sprockets or idlers rotate on axes fixed with respect to the trough sections which support them, and angularity is introduced between longitudinally different portions of the conveyor by relative lateral swinging, there are produced conditions which result in slack in the chain. The orbital length of the chain is predetermined by its construction, but the linear length of its orbit, measured between the sprockets or rollers at its ends, is changed upon lateral swinging of one portion of the conveyor relative to another, this due to the fact that as the laterally swingable portion is moved towards its extreme lateral positions, the chain is permitted to "cut the corner" about which the swingable portion of the conveyor pivots. Therefore, in the absence of provision to prevent it, slack would exist in the chain when the laterally swingable portion of the conveyor is at one side or the other of the center line of the machine, and, if the chain was made of a length which would be correct when the conveyor has the swinging portion thereof swung to one of its extreme lateral positions, the conveyor could not have its parts brought to mutually aligned positions because there would not be enough overall length in the chain to permit this. Various procedures have been adopted to meet this problem, and the present invention constitutes an improved solution of it.

An object of the invention is to provide an improved means for precluding the existence of undesirable slack during the lateral swinging of a portion of an articulated conveyor in either direction out of straight line relation to an associated portion. Another object of the invention is to provide an improved flight-type conveyor of articulated construction, having improved means for driving the conveyor chain and improved means for maintaining proper chain tension in all of the various positions of articulation of the conveyor. Other objects and advantages of the invention will hereinafter appear.

For a fuller understanding of this invention, reference may be had to the accompanying drawings, in which an illustrative embodiment and three modifications have been shown, to the following specific description of the illustrative embodiment and modifications, and to the appended claims.

In the drawings:

Figs. 1A and 1B taken together, constitute a plan view of a loading machine in which the invention is incorporated in one illustrative form, Fig. 1A showing most of the machine in plan, and Fig. 1B showing most of the laterally swingable delivery portion of the machine.

Figs. 2A and 2B together are central longitudinal vertical sections through the loading machine of Figs. 1A and 1B. A substantial amount of overlap exists between Figs. 2A and 2B, as will be observed. Fig. 1A shows the machine body and material gathering mechanism and a portion of the conveyor, while Fig. 2B shows the rearward portion of the conveyor and a portion in common with what is shown in Fig. 2A.

Fig. 3 is an enlarged, generally horizontal sectional view on the planes of the line 3—3 of Fig. 2B.

Fig. 4 is an enlarged vertical transverse section on the plane of the section line 4—4 of Fig. 2A showing the conveyor chain drive sprocket and a portion of the drive for the latter.

Fig. 5 is an enlarged vertical transverse section on the plane of the section line 5—5 of Fig. 2A showing the construction at the pivotal mounting of the delivery section of the conveyor.

Fig. 6 is an enlarged vertical transverse section on the planes of the section line 6—6 of Fig. 2A showing a portion of the take-up construction.

Fig. 7 is an enlarged oblique transverse section on the plane of the section line 7—7 of Fig. 2A showing an idler sprocket at the extreme forward end of the conveyor.

Fig. 8 is an enlarged vertical transverse section on the plane of the section line 8—8 of Fig. 2A illustrating details of construction of the arrangements providing for transverse swing of the rearward end of the delivery conveyor.

Fig. 9 is an enlarged vertical transverse section on the plane of the line 9—9 of Fig. 2B showing an extreme rear idler roller arrangement.

Fig. 12 is a horizontal sectional view on a plane corresponding to the plane of Fig. 3, illustrating a modification.

Fig. 13 is a similar view, further abridged in compass, showing another modification.

Fig. 14 is a transverse vertical section, with parts broken away, on a plane corresponding to that of Fig. 11, showing a further, more radical modification.

Figure 10:
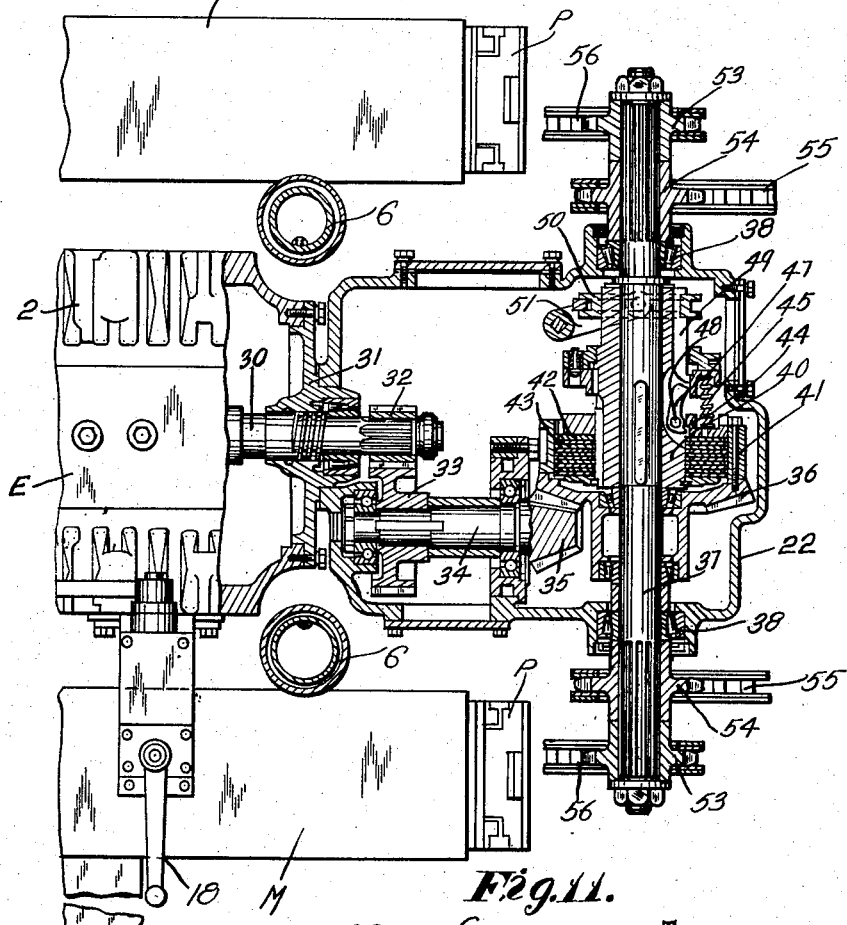
Fig 10 is a generally horizontal section on the plane of the section line 10—10 of Fig. 2A showing details of the drive of the conveyor, and on an enlarged scale.

Referring now to the drawings, and first to Figs. 1–11, it may be noted that the invention is there shown incorporated, in that particular illustrative form, in a loading machine, which is generally designated 1 and has a tractor mounting M and which consists principally of a tractor-supported main frame or body 2 having a gathering head generally designated 3 supported on the main frame 2 and an elevating and discharge conveyor hereinafter described and generally designated 4.

Before entering upon a detailed description of the elevating and discharge conveyor, it may be mentioned that, as herein shown, it includes a forward, rearwardly and upwardly extending material-elevating portion which may have its angle to a subjacent surface changed relative to a tractor mounting for the whole apparatus and which discharges onto a material-delivery portion the forward end of which underlies the discharge point of the material-elevating portion. The material-delivery portion comprises two portions: one of which is not laterally swingable relative to the tractor mounting and the second of which is laterally swingable relative to the first and which provides the discharge end of the conveyor, both of said portions being pivotable together upon a transverse axis relative to said material-elevating portion so that the height of discharge and the space beneath the rearward end of the material-delivery portion may be changed at will.

The main frame or body 2 is pivotable about a transverse axis 5 relative to its tractor mounting M. This pivoting action is under the control of hydraulic tilting and supporting cylinder and piston mechanisms 6, pivotally connected at 7, to portions of the main frame and having the lower ends of its piston rods 8 provided with eyes 9, into which pins 10 suitably carried by the tractor mounting M are inserted. The elevating and discharge conveyor 4 extends upwardly along the gathering head and then rearwardly from the gathering head and projects beyond the rear end of the main frame into a suitable position for discharging material into mine cars, shuttle cars, or other material transporting apparatus.

The tractor mounting M includes means for propelling the tractor treads P thereof by power and for steering the loading machine by the variable drive of the opposite treads so as to facilitate the maneuvering of the loading machine in limited spaces such as are frequently encountered in mines. However, the drive and control mechanism for the tractor treads is well-know and has been used in many machines sold by my assignee, so it need not be described in detail, and it will suffice to state that this drive and control is effected by power from a motor E whose casing forms a portion of the body 2 and plural speed reversible driving gearing, not shown, enclosed in a gear casing 17, and under the control of a control lever 18 and a brake lever 19, the latter being manipulable to hold either tractor tread against movement, or retard its rate of orbital movement.

The gathering or loading head 3 includes a pair of gathering devices 21, but as these are but illustrative of many gathering devices which could be employed to move the material to the conveyor mechanism proper, and since their specific structure is disclosed in detail in said application above mentioned, they need not now have further attention given to them.

Figure 11:
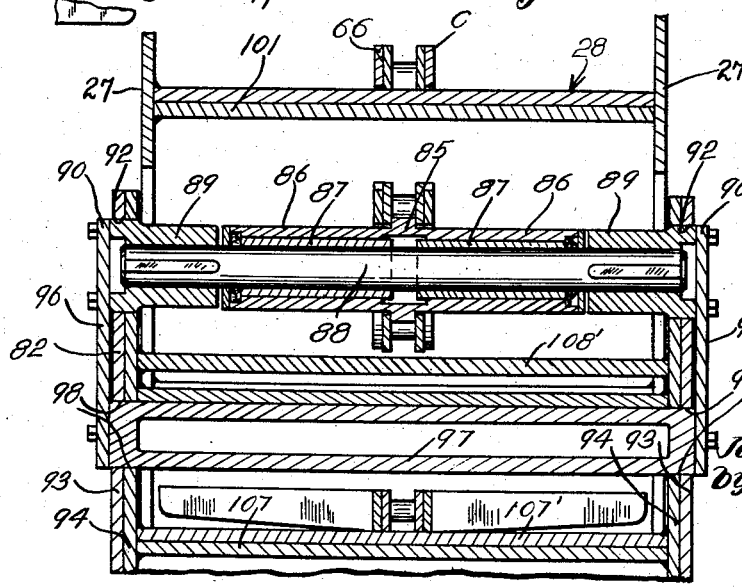
Fig. 11 is an enlarged vertical transverse section on the plane of the section line 11—11 of Fig. 2A showing details of the take-up structure including the mounting of the take-up roller.

The front end of the motor E has secured to it a gear casing 22 in which transmission mechanism forming a portion of the drive for the gathering devices 21 and also a portion of the drive for the conveyor is enclosed. This casing has a forwardly sloping top 24 on which the built-up structure of the gathering head is supported. The gathering head includes an inclined top plate 25, cut away as at 26 to provide access to a troughlike channel T in which the forward, material-elevating portion of a flight conveyor C is adapted to move. Side plates 27 are arranged at opposite sides of the troughlike channel T in which the flight conveyor moves and these are connected together by transversely extending inclined upper and lower deck plate structures 28 and 29. The upper portions of the side plates 27 have mounted upon them oppositely outwardly inclined portions 27', to reduce the possibility of lateral escape of material to the rear of the wide inclined plane at the gathering end of the loader. The motor E has a rotor shaft 30, which extends through the front head 31 of the motor casing and into the gear or transmission casing 22, within which the forward end of the shaft 30 carries a drive pinion 32, which meshes with a driving gear 33 on a suitably journaled shaft 34. The forward end of the shaft 34 carries a bevel drive pinion 35, which meshes with a bevel driven gear 36, rotatably mounted on a transverse shaft 37, supported by combined radial and thrust bearings 38 on the walls in the casing 22. The shaft 37 has secured to it a clutch element 40, and this clutch element and a sleeve 41 secured to the driven gear 36 have connected to them respectively clutch discs 42 and 43, which may be forced into frictional driving engagement with each other to enable the gear 36 to drive the shaft 37, when a clutch-applying ring 44 is permitted to move, under the force of springs 45, to press the clutch discs 42, 43 tightly together. The clutch loading element or ring 44 is controlled by bell crank levers 47, turnable on pins 48 carried by the element 40. These levers may be operated by reciprocable wedge elements 49 movable by a shipper ring 50 towards the bottom of Fig. 10 (towards the right, looking forward in the actual machine) to effect release of the clutch discs, and the shipper ring 50 is movable by a suitably controlled shipper element 51. The transverse shaft 37 carries at each of its opposite ends a pair of drive sprockets including outer sprockets 53 and inner and, as illustrated, somewhat larger, sprockets 54. The inner sprockets 54 are adapted to drive roller chains 55 which constitute a portion of the drive mechanism for the gathering devices. However, since the nature of the gathering mechanism drive per se does not enter into this invention, there need be no further description of this drive in this application. The outer sprockets 53 drive roller chains 56 which extend upwardly and rearwardly into driving relation with sprockets 57 mounted on a transverse shaft 58, and this transverse shaft carries, midway between its ends, a drive sprocket 60 which constitutes the driving means for the conveyor C. The endless flight-type conveyor C is movable in the trough T as previously explained. It consists of a centrally disposed continuous chain 66 having a plurality of laterally extending flights 67 thereon. This chain is drivingly engaged by the sprocket 60 heretofore described. It is continuous from end to end. At its forward end it passes about a suitable idler roller 71 (see Fig. 7) mounted on a suitably supported transverse shaft 72. At the rear end of the conveyor there is mounted another idler arrangement including an idler roller 75 (see Fig. 9), suitably journaled on an adjustable frame structure 76 carried by the rearward portion 77 of the delivery portion of the conveyor trough structure, shortly to be more fully described. Two other idler devices are associated with the conveyor chain, one, numbered 80, suitably journaled on a transverse shaft structure 81, extending between the opposite sides of the front trough portion 82 of a vertically swingable delivery trough section, later described, in a position to be engaged by the lower run, as is later also more fully described, of the chain 66. The other idler is best illustrated in Fig. 11. It is shown as an idler roller 85 on a sleeve 86, which is journaled on bushings 87 carried on a transversely extending shaft 88 mounted in sleeves 89 which are fixed to a frame structure 90 and which are slidable in openings 92 formed in side plate elements 93 and 94 which form a part of the trough portion 82. The frame structure 90 has downwardly extending portions 96 at either side thereof and these are connected to a transverse boxlike element 97 extending through openings 98 in the side plate structures 93 and 94 and adapted to be caused to reciprocate longitudinally of the center line of the loading machine and of the conveyor, as will shortly be described.

Before describing further details of the conveyor trough structure, it may be noted that the chain 66 extends in one continuous length from the forward idler 71 upwardly to the drive sprocket 60, forwardly and downwardly from the drive sprocket 60 to the idler roll 85, clockwise and downwardly about the idler roll 85, and rearwardly along the upper deck plate of the delivery conveyor portion, shortly to be described in more detail, to and around the idler 75, forwardly along the lower deck plates of the conveyor portions 77 and 82, angularly, forwardly and downwardly about the idler 80 and then downwardly along the plate 29 to the forward idler roll 71. It will be noted that the bodily movable idler roller 85 is in a loop or bight in the chain, which may be referred to for convenience as 100, and that bodily movement of the frame 90 to the right in Fig. 2A is adapted to maintain chain tension in the event that slack is introduced into the chain and that return (leftward) movement of the idler 85 returns "slack" into the chain as may be required.

Now let it be noted that the rear end portion 77 of the delivery conveyor trough structure is pivotally connected for lateral swinging about a vertical axis X—X and that the front portion 82 of the delivery conveyor trough structure is mounted for vertical swinging movement—note that the portion 77 swings upwardly and downwardly with it—upon a horizontal transverse axis Y—Y. The arrangements with respect to the axis Y—Y will be noted, then the arrangements for swing about the axis X—X, and then the improved take-up arrangements can readily be explained.

The portion of the conveyor trough which is associated with the gathering mechanism and which serves to elevate material has already been noted to provide a trough-like channel T and to be formed by side plates 27, upper and lower deck plate structures 28 and 29, and to have flaring plate portions 27', 27' at its upper part. This structure is rigidly mounted on the inclined plate 24. The lower deck plate structure does not extend a great distance beyond the top of the inclined plate 24, but the deck plate structure 28 runs nearly to the upper end of this portion of the conveyor. Above the point where the lower deck plate ends, the elevating conveyor portion comprises the side plates 27 with their flaring wing portions 27' and connected together by the deck plate structure 28, which comprises a main deck plate 101 covered by a wear plate 101'. The plates 27, 101 and 101' are all welded together. The plates 27, where the relatively tiltable portion 82 of the delivery conveyor portion is mounted, are also connected together by a tubular element 102 (see Fig. 5) within whose opposite ends bushings 103 are provided, and a shaft 104 is journaled in the bushings. This shaft extends into cap plates 105 which extend through openings 106 in the side plates 93, 94 of the tiltable delivery conveyor structure, the cap plates 105 being rigidly secured to the side plates 93, 94 and connected to the shaft 104 so that the shaft rotates in the bushings 103 during tilting of the delivery portion of the conveyor. To effect vertical pivotal adjustment (tilting) of the portion 77 about the horizontal transverse axis Y—Y extensible cylinder and piston mechanisms 95 are provided, being pivotally connected at 95' to the portion 77 and at 95" to the supports of the main frame 2 on the tractor mounting M.

As previously noted the delivery portion of the conveyor trough structure comprises a front portion 82 and a rear end portion 77 which is laterally swingable relative to the portion 82. The portion 82 at its forwardmost end includes only lower deck plates, which, with their covering wear plates are shown at 107, 107', and these are rigidly connected to the side plates 93, 94, between which they extend. Further to the rear the side plates 93, 94 are also connected together by an upper deck plate 108 having a wear plate 108' covering it.

As previously indicated, the rear end portion 77 of the conveyor is swingable laterally. The structure for accomplishing this is best shown in Figs. 2A, 2B and 3. It will be noted that the deck plate 108 has secured to it a hollow pivot element 111 which, through a suitable bearing sleeve 111', provides a bearing for an element 113 which, at its rearward end, is secured to a deck plate structure 114 which will be further described.

Coaxial with the pivot element 111 and below the latter, there is another pivot element 115 which is supported in a boxlike structure 116 secured to the lower portions 117 of the side plates 94 and also to the wear plate 107'. With this last pivot providing element, there cooperates a bearing member 120 which is carried by the lower part of another box-like section 121 which is secured at its top to a lower deck plate portion 122 of the swingable rearward portion 77 of the conveyor. Cylinder and piston mechanisms 124 are arranged within the space between the pivot elements 111 and 115, the cylinders being pivotally connected at 125 to pivot blocks suitably secured to the frame structure which carries the pivot element 115, and the pistons being pivotally connected to the frame 121. The cylinder and piston mechanisms are double acting and concurrent admission of fluid to one end of one cylinder and piston mechanism and to the other end of the other effects lateral swinging of the rear end portion 77 upon the axes of the pivot elements 111 and 115.

The deck plate structure 114 of the rear end portion 77 of the conveyor trough section comprises upper and lower deck plates 141 and 122, previously mentioned, fastened to and extending between side plates 143. The deck plate 141 carries a wear plate 141' whose forward end 145 is formed on an arc 146 struck from a point in the straight line in which the axes of the pivot elements 111 and 115 lie. The lower deck plate 122 has a forward arcuate portion 145' whose arc 146' is essentially the same as the arc 146. The arcuate portions described are adapted to cooperate with rounded portions 151 and 152 formed respectively at the rear end of the wear plate 108' and at the rear end of the wear plate 107'. The chordal distance between the ends of the arcs 146 and 146' exceeds the width of the remainder of the rear end of the conveyor portion 77, and the rounded portions 151 and 152 are wider than the conveyor portion 82 in advance of them. The rearward ends of the side plates 94 diverge arcuately as shown at 155 to conform to the curvature of the rounded portions 151 and 152. The side plates 143 are also curved at their forward ends 156 and diverge to conform to the widened forward ends of the deck plates 141 and 122. To prevent the escape of material in its passage over the rounded portion 151, flexible side plates 161 are suitably secured, as by welding, to the side plates 94 of the trough portion 82 forwardly of the curved rearward ends of their side plates. The rearward ends of these flexible plate portions 161 are held by guides 162 in sliding relation to the forward ends of the side trough plates 143 which form a part of the rearward laterally swingable trough section 77. The lower edges of the flexible plate portions 161 lie close to the top of the rounded portion 151 of the wear plate 108', and as the rearward trough section swings laterally the flexible plate portions 161 guide the ends of the flights of the conveyor C, and keep the material from lateral escape. The forwardly diverging ends of the side plates 143 and the rearwardly diverging ends of the side plates 94 guide the return run of the conveyor chain in all positions of lateral adjustment of the rear end portion 77 of the conveyor trough structure.

As has been explained, lateral swinging of the delivery end of the conveyor either introduces slack into, or requires slack for the extension of the conveyor chain, depending upon whether swing is away from or towards the central longitudinal vertical plane extending through the forward conveyor section. This creation and need for slack is taken care of according to the present invention by providing for the sliding of the frame structure 90. Arrangements are made to move this frame structure and its supported idler roller 85 forwardly when it is necessary to take up slack, that is, when the delivery end of the conveyor is swung laterally away from its central position. These arrangements also provide for permitting the frame and the idler roller to move rearwardly, under the pull of the chain, as the rearward end of the conveyor moves from laterally swung position towards central position. To accomplish these functions, the boxlike element 97 which forms a portion of the frame structure 90 has associated with it a hollow boxlike element 165. This is guided in depending guide elements 166 and 167, carried by the front portion 82. This element 165 will be observed to be a thrust transmitting element and it has mounted at its rearward end on a vertical pivot 170, a cam engaging roller 171. The member 165 is guided for sliding movement midway between the sides of the front portion 82 and does not undergo lateral movement as the delivery end of the conveyor is moved into and out of central position. A cam 175 is secured to the pivotal support element 113 for swing with the latter and it has a face 176 which is so formed that as the delivery end of the conveyor is swung laterally, the cam 175 cooperates with the roller 171 in such a manner as to force the frame 90 and the idler roll 85 forwardly at an appropriate rate to take up slack as it is produced as the conveyor delivery end swings laterally out of central position, and to permit the idler to move rearwardly under the pull of the chain in such a manner as to prevent excessive tension on the chain. Because of the employment of an idler in a bight of the chain, the necessary movement of the idler is reduced. Because of the arrangements wholly inside the orbit of the chain the tension controlled mechanism is completely protected. When overall height is not a substantial consideration the simplicity of this arrangement recommends it, and it is obviously simple in construction, rugged and effective. The cam contour can be arrived at by design and then empirically modified to final form.

In the use of conveyors of the articulated, center-chain, flight-type there are slight variations in effective chain length as the chain passes around the drive sprocket, and absolute tightness or tautness cannot be maintained, and accordingly it may be desirable to provide a spring or springs, as between the ends of the hollow box-like element or strut. Accordingly, as shown in Fig. 12 the box-like structure 165' is made in two parts: a forward portion 179 and a rearward portion 180, the former having an opening 181 polygonal in cross section receiving a correspondingly cross-sectioned reduced portion 182 formed at the forward end of the rearward portion 180, and the portion 182 is traversed by a slot 183 through which a cross pin 184 carried by the portion 179 extends, there being enough length to the slot to take care fully of any need for extension or contraction of the composite strut structure 165'. The portion 180 has oppositely extending wing portions 185, 185, each traversed by an opening 186. The guide element 167 is provided with a pair of openings 187, 187, and rods 188, 188 have heads 189, 189 held as by welding to the box structure 97 and the rods are slidably received in the holes or openings 186. Springs 190, 190 surround the rods and are centered by the heads 189, 189 and by sleeves 191, 191 surrounding the rods and desirably secured to the wing portions 185, 185. The springs are under suitable compression to perform their function of expanding or contracting slightly when such occurrences as chording of the chain occurs, but the differences in effective chain length resulting from swinging of the delivery end of the conveyor are wholly taken care of by the cam and strut construction.

According to a somewhat broader aspect of the invention, the use of the cam actuation of the push rod may be replaced by the use of spring means to maintain the frame structure 90 in suitable cooperation relative to the conveyor chain. Because the spring means can conveniently be arranged with the axes thereof coplanar with the axial line of the box-like element 165'', the arrangement or modification shown in Fig. 13 may be employed. It will be noted that the cam 175 and the cam engaging roller 171 has been omitted, and the hollow box-like element 165'' serves now only a guiding function. To replace the cam control, the frame structure 90' is provided with wings 195, 195, and oppositely facing wings 196, 196 are secured to the side plates 94 and rods 188' are disposed outside the space between the side plates and arranged parallel to the box-like element 165'' and the rods have heads 189' desirably fixed to the wings 195 and extend through guide sleeves 191' and through holes 186' in the wings 196, and springs 190' are guided and supported by the rods. These springs must be under a minimum compression when fully expanded to take care of the normal tension of the system when the delivery end of the conveyor is at a maximum angle to its central position, and must be compressible to accommodate the movement of the idler 85 when the delivery end of the conveyor is in, or returns to, central position.

According to a still broader aspect of my invention the guide rod structure 165'' and the box structure 97 can be omitted entirely, and springs 190'' be supported, as shown in Fig. 14, on rods 188'' engaging wings 189'' carried at the outer ends of the sleeves 89, said rods being supported at their other ends as are the rods 188' of Fig. 13, the only difference being in the height of the wings which support such rearward rod ends. The springs will evidently correspond in strength and resilience and loading to those of Fig. 13, as they must both take up slack, as it were, and accommodate changes in the lateral positioning of the delivery end of the conveyor.

This application is a continuation of my copending application, Serial No. 324,026, filed December 4, 1952, now abandoned.

While there are in this application specifically described one illustrative embodiment which the invention may assume in practice, and three modifications thereof, it will be understood that these are shown for purposes of illustration and that the invention may be further modified and embodied in various other forms without departing from its spirit or the scope of the appended claims.

What I claim is:

1. In a conveyor apparatus, a pair of conveyor frame sections disposable in longitudinal alignment, one of which has a free end and is swingable about an upright axis relative to the other frame section to vary the location laterally of said free end, said other frame section being relatively stationary as regards lateral swing, said relatively stationary frame section having an end overlapping and overlying said swingable frame section, an endless flexible conveyor extending between the relatively remote ends of said conveyor frame sections and guided for circulation relative thereto, said conveyor having active and return runs, said active run having a loop therein adjacent the overlap of said frame sections and the portion of the active run on one side of the loop discharging onto the portion of the conveyor which is on the other side of said loop, a reversing idler in said loop and mounted for guided movement on said relatively stationary frame section, and means for bodily moving said idler along a rectilinear path to preclude the existence of excessive slack in said conveyor in the different laterally swung positions of the free end of said swingable frame section including a shiftable tensioning device extending longitudinally of said relatively stationary frame section and lying for its full length between said reversing idler in said loop and the pivoted end of said swingable frame section and an actuating element mounted on said swingable frame section to turn therewith for moving upon swinging thereof said tensioning device longitudinally bodily to move said reversing idler forwardly along a rectilinear path automatically to increase the length of said loop to effect tensioning upon lateral movement of said swingable frame section away from its position of alignment with said relatively stationary frame section.

2. In a conveyor apparatus, a pair of conveyor frame sections disposable in alignment, one of which has a free end and is swingable about an upright axis relative to the other frame section to vary the location laterally of said free end, said other frame section being relatively stationary as regards lateral swing and having an end overlapping and overlying said swingable frame section, an endless flexible conveyor extending between the relatively remote ends of said frame sections and guided for circulation relative thereto, said conveyor having active and return runs, said active run having a loop therein adjacent the overlap of said frame sections and the portion of the active run on one side of the loop discharging onto the portion of the conveyor on the other side of the loop, a reversing idler in said loop and mounted on said other frame section, and means for bodily moving said idler to preclude the existence of excessive slack in said conveyor in the different laterally swung positions of the free end of said swingable frame section including a shiftable tensioning device lying for its full length between said reversing idler in said loop and the pivoted end of said swingable frame section for moving said reversing idler bodily forwardly along a guided path to increase automatically the length of said loop upon lateral movement of said free end of said swingable frame section as the latter is moved from alignment with said other frame section, said reversing idler moving means including resilient means having a longitudinal axis extending lengthwise of said other frame section, all tensioning pressures being transmitted by said tensioning device through said resilient means whereby said conveyor is at all times yieldingly maintained under the desired tension irrespective of the laterally swung position of said swingable frame section.

3. A conveyor apparatus as set forth in claim 2 wherein said resilient means of said reversing idler moving means is arranged to act longitudinally of said other frame section and means is swingable with said swingable frame section for actuating said shiftable tensioning device.

4. In a conveyor apparatus, a pair of conveyor frame sections disposable in alignment, one of which has a free end and is swingable about an upright axis relative to said other frame section to vary the location laterally of said free end, said other frame section being relatively stationary as regards lateral swinging and having an end overlapping and overlying said swingable frame section, an orbitally moving endless flexible conveyor extending between the relatively remote ends of said conveyor frame sections and having active and return runs, said active run having a loop therein adjacent the overlap of said frame sections and the portion of the active run on one side of the loop discharging onto the portion of the conveyor on the other side of the loop, a driving element for said conveyor engaging the active run of the latter just ahead of said loop, a reversing idler in said loop and mounted for movement on said other frame section, and means for bodily moving said idler automatically to preclude the existence of excessive slack and said conveyor in the different laterally swung positions of the free end of said swingable frame section including a shiftable device lying for its full length inside the orbit of said conveyor in advance of said upright axis for bodily moving said reversing idler forwardly along a guided path automatically to increase the length of said loop upon lateral movement of said free end away as said swingable frame section is swung from alignment with said other frame section.

5. In a conveyor apparatus, a pair of conveyor frame sections disposable in alignment, one of which has a free end and is swingable about an upright axis relative to the other frame section to vary the location laterally of said free end, said other frame section being relatively stationary as regards lateral swing, and having an end overlapping and overlying said swingable frame section and an opposite material receiving end, an endless flexible conveyor extending between the relatively remote ends of said conveyor trough sections and guided for circulation relative thereto, said conveyor having active and return runs, said active run having a loop therein adjacent the overlap of said frame sections and the portion of the active run on one side of the loop discharging onto the portion of the conveyor on the other side of the loop, a reversing idler in said loop and mounted for movement on said other frame section, a drive for said conveyor engaging the active run thereof forward, in terms of the direction of conveyor travel, of said loop and spacially disposed rearward of said reversing idler in said loop, and means for bodily moving said idler along said other frame section to preclude the existence of excessive slack in said conveyor in the different laterally swung positions of the free end of said swingable frame section including a shiftable device lying for its full length between said reversing idler in said loop and the pivoted end of said swingable frame section for bodily moving said reversing idler forwardly automatically to increase the length of said loop upon lateral movement of said free end as said swingable frame section is swung away from alignment with said other frame section.

References Cited in the file of this patent
UNITED STATES PATENTS

| 723,504 | Titus | Mar. 24, 1903 |
| 1,160,791 | Van Houten | Nov. 16, 1915 |
| 1,231,495 | Cleaver et al. | June 26, 1917 |
| 2,388,385 | Cartlidge | Nov. 6, 1945 |
| 2,506,579 | Cartlidge | May 9, 1950 |
| 2,613,800 | Merck | Oct. 14, 1952 |

FOREIGN PATENTS

| 28,794 | France | Dec. 29, 1924 |

(Addition to No. 575,283)